Patented July 2, 1946

2,403,167

UNITED STATES PATENT OFFICE 2,403,167

LUBRICANT

Herman E. Ballard, Berkeley, Calif.

No Drawing. Application March 1, 1941,
Serial No. 381,411

4 Claims. (Cl. 252—37)

This invention relates to lubricant compositions and processes of lubrication and more particularly to those for high pressure and high temperature services.

The invention is of particular value for lubricating and sealing the seating surfaces of plug valves used in controlling the flow of fluids under high temperatures and high pressures. Such plug valve devices are generally provided with grooves in the seating surfaces forming a frame around the passageways and into which lubricant of a plastic nature is injected under pressure to provide a seal against leakage and to promote easy rotation of the plug member in its seat. The ability of the lubricant to perform these sealing and lubricating functions in a satisfactory manner depends not only upon the pressures and temperatures it is required to withstand but also upon its behavior under attack by the line fluid.

The additional factor of the line fluid introduces complications not encountered in selecting lubricant compositions for ordinary services, such as bearings of machinery not exposed to fluids. A composition which may be effective under the pressure and temperature conditions of the valve might yet be soluble in the line fluid and thus incapable of forming a seal. On the other hand, the composition may be insoluble in the line fluid but still be unable to adhere to the surfaces in the presence of the particular line fluid due to the superior wetting qualities of the latter. Such composition would be washed off the surfaces and carried away by the fluid stream without exerting any sealing effect.

As a departure from the conventional types of oils and greases for use under high pressures and temperatures it has been proposed to employ particles of organic materials as the primary lubricant and to suspend these particles in a carrying medium in which they are insoluble both at room and high temperatures. These particles differ from the solid type, such as graphite, in that they are yieldable and capable of viscous or plastic flow at high temperatures. Such developments have for their object a suspension of gel particles insoluble in the vehicle and stabilized. A common characteristic of such composition is that the particles of organic material are mixed with a liquid capable of solvating or swelling them, without dissolving them, and distributed as gelcose particles in the carrying medium which may be the same or a different liquid.

While such developments of the prior art have had their uses in the general lubrication field, the problems encountered in lubricating and sealing the seating surfaces of valves are not solved by these advances. In the branch of the art to which this invention is particularly adapted the effect of the line fluid is of equal, if not superior, importance to that of pressure and temperature. With these considerations in mind it is evident that a lubricating or sealing composition which will be serviceable must depart radically from prior conceptions.

A composition made in accordance with this invention consists principally of finely divided elastic particles distributed in discrete form in a carrying medium and constituting a lubricant which retains its consistency at ordinary temperatures during use or in storage. In general, at ordinary temperatures the particles remain elastic, but this characteristic may undergo change when extreme temperatures are encountered. Apparently, the sealing function of the composition in valves at ordinary temperatures is due, not to an insoluble lubricant film as in prior lubricating practice, but to the presence of a resilient cushion or pad formed by the mass of discrete particles confined within the frame of grooves around the valve passageways.

It further appears that if the plastic composition is attacked by the line fluid in the valve there may be a swelling of the individual particles and consequent impairment of the elastic properties. Due, however, to the high degree of insolubility possessed by the particles a considerable quantity of the line fluid can be absorbed thereby to form a new plastic composed of the particles and the line fluid. Such composition withstands high pressures and its consistency is adequate to seal the valve.

The type of particles possessing the characteristics described are conveniently made from synthetic rubber-like materials of which there are many commercial varieties obtainable. Such materials are distinguished from natural rubber chiefly by their resistance to deterioration in the presence of petroleum products and under high temperatures. Some of the synthetic materials have, in addition, the ability to retain their tensile strength in the presence of hot petroleum oils, but, as previously stated, this quality is not important in the services for which this invention is particularly adapted. Hence, the choice of materials is not limited to those possessing this last named characteristic. On the contrary, the swelling at high temperature in the presence of mineral oil is a valuable feature of the preferred material for use in the lubricating composition.

Synthetic rubber materials at present on the market include butadiene polymers and copolymers, chloroprene polymers, organic polysulfides, isobutene polymers, and plasticized vinyl chloride polymers. A relatively large number of commercial varieties are obtainable and can be used in accordance with this invention.

The synthetic rubber may be comminuted by grinding or other suitable means for incorporation into the composition. A typical formula is comminuted butadiene copolymer about 50 per cent, aluminum stearate about 12.5 per cent and petrolatum about 37.5 per cent. The aluminum stearate and petrolatum are mixed together at approximately 300° F. and allowed to cool prior to the time the butadiene copolymer is introduced. Satisfactory mixing of the comminuted synthetic particles and the vehicle may be achieved by the ordinary mortar and pestle.

The composition when made remains stable and uniform when standing over long periods of time. The particles are suspended in the plastic forming medium and the preparation can be molded into stick form for ease of use in valves and other devices.

A composition using butadiene copolymer particles suspended in the carrying medium displays marked advantages when tested for lubricating and sealing qualities in plug valves controlling the flow of petroleum oil at elevated temperatures. The composition inserted in the lubricant grooves surrounding the fluid passageways in the valve seating surfaces forms, in effect, a series of resilient cushions or pads between the seating surfaces which act as barriers to leakage of the line fluid. This seal is effective even if the surrounding portion of the seating surfaces are not coated with the composition.

The carrying medium soon becomes dissolved out by the action of the line fluid leaving only the particles of butadiene copolymer. These particles absorb relatively large amounts of the line fluid and become swollen. However, even though the particles lose a great deal of their tensile strength in thus becoming plastic and softened, the newly formed composition is none the less effective for lubricating and sealing the valve. When finally washed away due to the flow of line fluid the soft plastic forms no residue and thus no clogging of the line can occur.

This material has proved effective on services involving the conveyance through pipe lines of petroleum oils having temperatures up to 600° F. It will also withstand high pressures of the order of 18,000 pounds per square inch without seizure of metal parts. When other synthetic materials are substituted for the butadiene copolymer the temperature and pressure limits and insolubility characteristics may vary. Chloroprene polymers may harden in the presence of mineral oil if the temperature exceeds 300° F., but in other circumstances the material has equal value with the butadiene copolymer.

It will be apparent that the composition finds a wide field of usefulness for lubricating and sealing surfaces exposed to the flow of fluids under high temperatures and pressures. It may be used with particular benefit with coal tar solvents with mixtures of steam or water solutions, alkalis and acids, also with turpentine, rosin, wood creosote, steam and water. The number of different lubricants required by oil refineries and in other industrial processes are greatly reduced by this general purpose composition.

I claim:

1. A sealing and lubricating composition comprising finely divided particles of synthetic rubber material of the class consisting of butadiene polymer and copolymer, chloroprene polymer, organic polysulphide, and plasticized vinyl chloride polymer distributed in discrete and undissolved form throughout a mixture of petrolatum and aluminum stearate.

2. The process of lubricating and sealing the seating surfaces of valves and the like controlling the flow of fluids under high temperatures and pressures, comprising injecting a mixture of particles of synthetic rubber material of the class consisting of butadiene polymer and copolymer, chloroprene polymer, organic polysulphide, and plasticized vinyl chloride polymer suspended in a plastic carrying medium in which said particles remain undissolved between said seating surfaces, and bringing hot petroleum line liquid in contact with said particles to combine and form a new composition therewith.

3. The process of lubricating and sealing valves and the like having frames of lubricant grooves in the seating surfaces around the fluid passageways and controlling the flow of fluids under high temperatures and pressures, comprising injecting a mixture of particles of synthetic rubber material of the class consisting of butadiene polymer and copolymer, chloroprene polymer, organic polysulphide, and plasticized vinyl chloride polymer suspended in a plastic carrying medium in which said particles remain undissolved into said grooves until said particles are massed in the form of resilient cushions confined within said frames of grooves, and bringing hot petroleum line liquid in contact with said particles to combine and form a new composition therewith.

4. A sealing and lubricating composition comprising about 50 per cent butadiene copolymer in finely divided particle form, 37.5 per cent petrolatum and 12.5 per cent aluminum stearate.

HERMAN E. BALLARD.